United States Patent [19]

Castle

[11] 4,130,134

[45] Dec. 19, 1978

[54] MATERIAL CONVEYING APPARATUS

[75] Inventor: Harold J. Castle, Yankton, S. Dak.

[73] Assignee: Morgen Manufacturing Company, Yankton, S. Dak.

[21] Appl. No.: 749,798

[22] Filed: Dec. 13, 1976

[51] Int. Cl.² ........................... B67D 5/64; F16L 3/00

[52] U.S. Cl. .................................... 137/615; 222/527; 141/387; 366/68

[58] Field of Search ......................... 137/615; 214/141; 141/388, 387; 285/181, 168; 212/144, 55, 56; 417/900; 259/169, 172; 222/527

[56] References Cited

U.S. PATENT DOCUMENTS

| | | | |
|---|---|---|---|
| 3,707,990 | 1/1973 | Schaible et al. | 137/565 |
| 3,942,554 | 3/1976 | Werner et al. | 137/615 |
| 4,015,625 | 4/1977 | Alexander | 137/615 |

*Primary Examiner*—Martin P. Schwadron

*Assistant Examiner*—A. Michael Chambers

*Attorney, Agent, or Firm*—Dorsey, Windhorst, Hannaford, Whitney & Halladay

[57] ABSTRACT

An apparatus for conveying materials having first and second support members movable longitudinally with respect to each other, a third support member positioned between the first and second support members and movable along a line extending therebetween, first and second rigid conduit sections having one end supported respectively by the first and second support members and a third rigid conduit section having its ends swivelly connected to the other ends of the first and second conduit sections and supported by the third support member, whereby as the first and second support members move longitudinally with respect to each other, the first, second and third conduit sections expand and retract accordingly.

20 Claims, 15 Drawing Figures

MATERIAL CONVEYING APPARATUS

BACKGROUND OF THE INVENTION

The present invention relates generally to a material conveying apparatus, and more particularly, to a material conveying apparatus comprising a conveying conduit means which is longitudinally extendable and retractable to facilitate the conveying of various substances and materials such as concrete or the like to areas remote from the point at which the material to be conveyed is supplied to the conveyor. The present invention is particularly applicable for conveying materials such as concrete to hard to reach places such as areas below the surface of the earth for foundations and above the surface of the earth onto various floor levels during the construction of multiple story buildings.

There are several types of conveying systems which are presently being used to convey concrete or other material from the point at which the material is supplied to the point at which it is to be used. These systems include bucket conveyors, apron conveyors, and various types of endless belt conveyors. With each type of conveying system, an ultimate objective is to build a conveying system which is mobile, so that it can be easily moved from one location to another, and which has flexibility of reach to convey the materials to all areas relative to the point at which the material is supplied to the conveyor. In moe recent systems, endless belt conveyors have been mounted in telescopic relation to each other to facilitate greater reach or mounted on radially movable and longitudinally extendable booms or supports to facilitate spreading of the concrete or material over a greater area.

Although the prior concrete and material conveying systems have served their intended purpose reasonably well, there are still several disadvantages of the prior systems. First, many lack the ability to spread or convey concrete or other material over an area from a point adjacent the point at which the concrete is supplied to a point remote from that supply point. This is a particular limitation of the conventional telescoping endless belt type conveyors since there is a limit to how far the conveyor can be retracted or telescoped inwardly. Secondly, many of the prior art conveyors are limited in the vertical angle at which they can convey concrete or other materials. For example, with an open, endless belt conveyor system, the vertical angle at which concrete or other material can be conveyed is limited by the fact that if the angle becomes too great, the concrete or other material begins to fall back toward the supply point. Thus, conveyors of this sort cannot convey materials to points vertically above the supply point nor can they convey materials to a point immediately adjacent to the supply point.

For the reasons discussed above, among others, there is a real need for a concrete or other material conveying apparatus which has complete flexibility to convey such materials to a point adjacent to the point at which the materials are supplied to the conveyor as well as remote points and to convey materials to points vertically above such supply point.

SUMMARY OF THE INVENTION

In general, and in contrast to the prior art, the present invention is a conveying apparatus which has the ability to convey materials such as concrete and the like to points immediately adjacent the point at which material is supplied to the conveyor as well as to more remote points. Further, the present invention comprises a conveying apparatus which has the ability to convey materials such as concrete and the like vertically upwardly to points directly above the point at which the material is supplied to the conveyor.

Specifically, the present invention includes a conduit conveying system in which the conveying conduit is extendable longitudinally to provide flexibility of conveyor reach. In order to accomplish this, the conveyor system of the present invention includes first and second support means movable toward and away from each other longitudinally along a generally straight line extending through such support means. These first and second support means each support one end, respectively, of first and second rigid conduit conveying sections. The other ends of such conveying sections are swivelly connected to a third or intermediate conduit conveying section which in turn is supported between its ends by a third support means positioned between the first and second support means and movable relative to the first and second support members along a line extending therebetween. The three conduit conveying sections and the third support means are associated with and related to each other such that when the first and second support members are moved toward each other to a retracted position, the conveying sections collapse or fold to a retracted position but still permit the conveyance of concrete or other material. When the first and second support members are moved away from each other to an extended position, the conveying sections expand to an extended position. In the actual embodiment of the present invention, the total length of the first and second and intermediate conduit conveying sections approximates the distance between the first and second support means when such means are in their extended position relative to each other.

In some embodiments of the present invention, the first, second and third support means are associated with a longitudinally, extendable boom which is also movable at one end about both a vertical and horizontal axis. Such embodiments not only permit the longitudinal extension and retraction of the conveying means but also the raising and lowering and the swinging of such means from side to side.

In general, the conveying apparatus of the present invention can be characterized as having first and second support means movable longitudinally with respect to each other along a straight line extending through such support means and a third support means having at least one support member which is movable longitudinally generally along a straight line extending between the first and second support means. The conveying apparatus also comprises a material conveying conduit having a first relatively rigid conduit section being connected with and supported by the first support means near one of its ends, a second relatively rigid conduit section being connected with and supported by the second support means near one of its ends, and a generally U-shaped third conduit section having one of its ends swivelly connected to the other end of the first conduit section and its other end swivelly connected to the other end of the second conduit section. The third conduit section further includes at least one relatively rigid intermediate conduit member which has one end swivelly connected either to the other end of the first conduit section or to an end of an adjacent intermediate conduit section and its other end swivelly connected either to the other end of the second conduit means or an end of an adjacent intermediate conduit section. The intermediate conduit section is supported by a corresponding support member of the third support means.

Accordingly, it is an object of the present invention to provide a concrete or other material conveying apparatus which has increased flexibility as to the areas in which it can convey such concrete or other materials.

Another object of the present invention is to provide an improved conduit conveying apparatus which is extendable and retractable longitudinally.

A further object of the present invention is to provide an improved conduit conveying apparatus which is extendable and retractable longitudinally and also movable laterally in rotation about a generally vertical axis and upwardly and downwardly in rotation about a generally horizontal axis.

These and other objects of the present invention will become apparent with reference to the drawings, the description of the preferred embodiment and the appended claims.

FIG. **6*a*** is a pictorial view of the swivel connection between two sections of the rigid conveying conduits.

Figure 7:
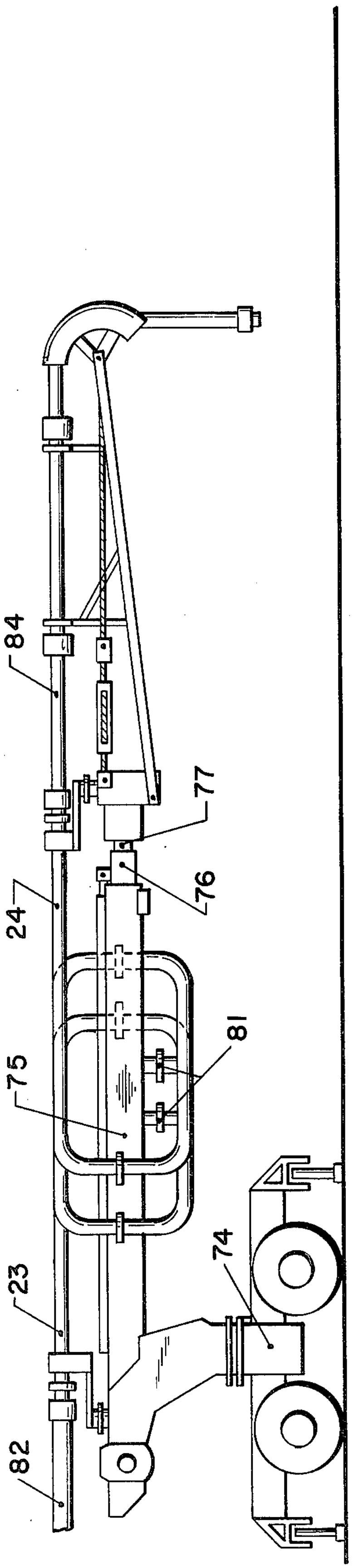

FIG. 7 is an alternate embodiment of the conveying apparatus of the present invention showing the conveying portion mounted on a hydraulically operated crane in its retracted position and showing multiple intermediate conveying sections.

Figure 8:
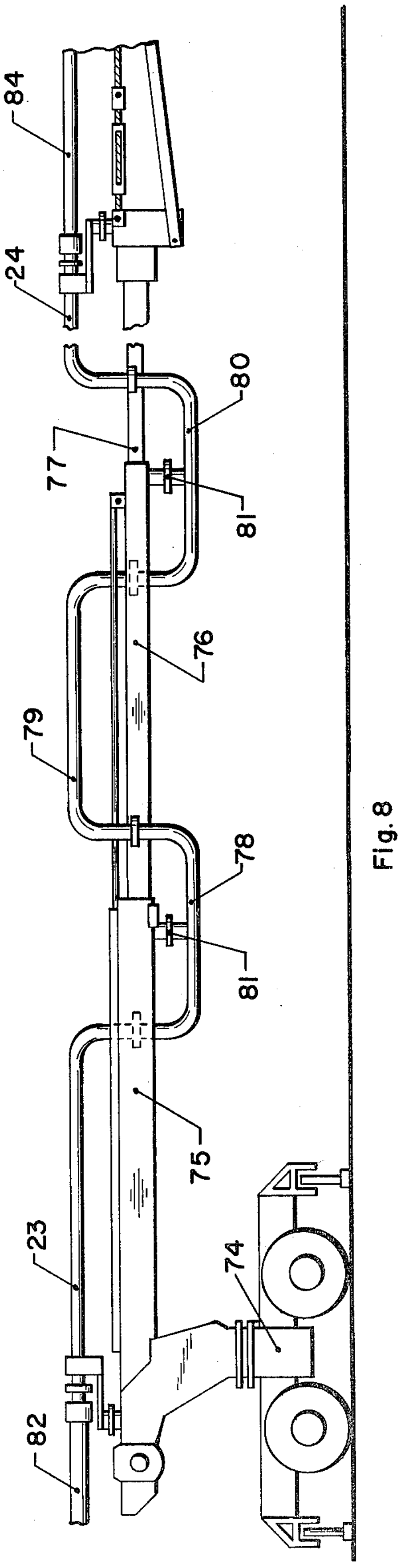

FIG. 8 is a view of the embodiment of FIG. 7 showing the conveying means in its extended position.

Figure 9:
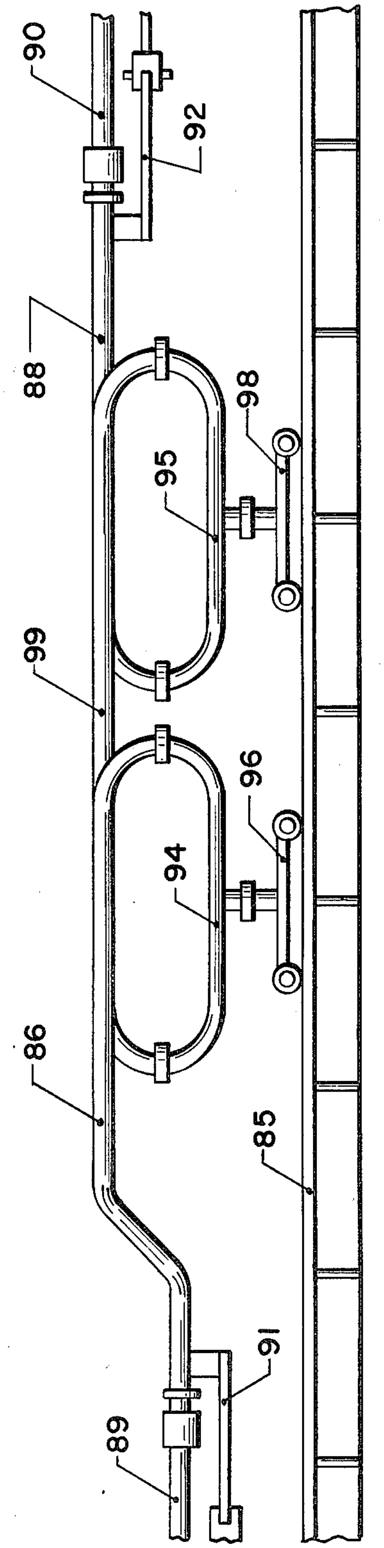

FIG. 9 shows an alternate embodiment of the present invention.

Figure 10:
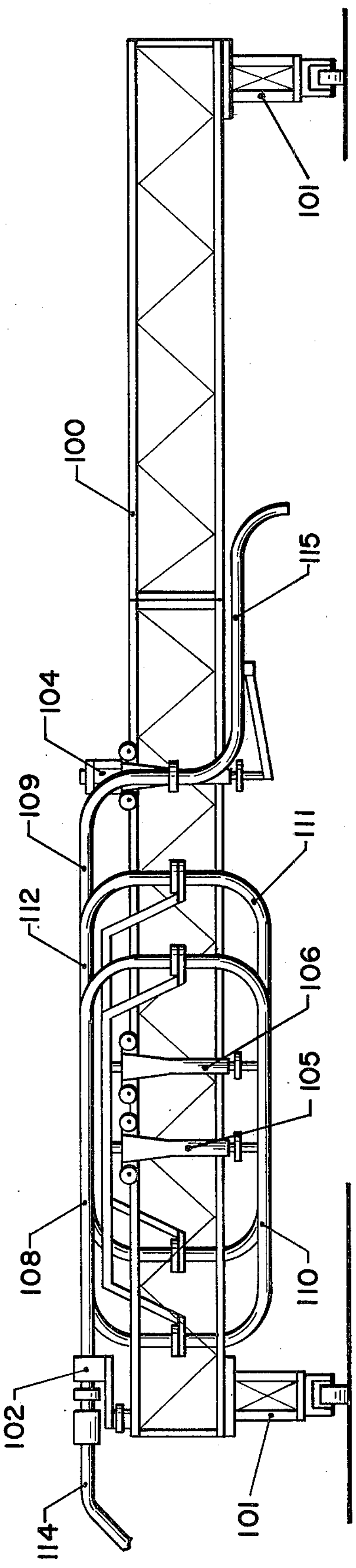

FIG. 10 shows an alternate embodiment of the present invention.

Figure 11:
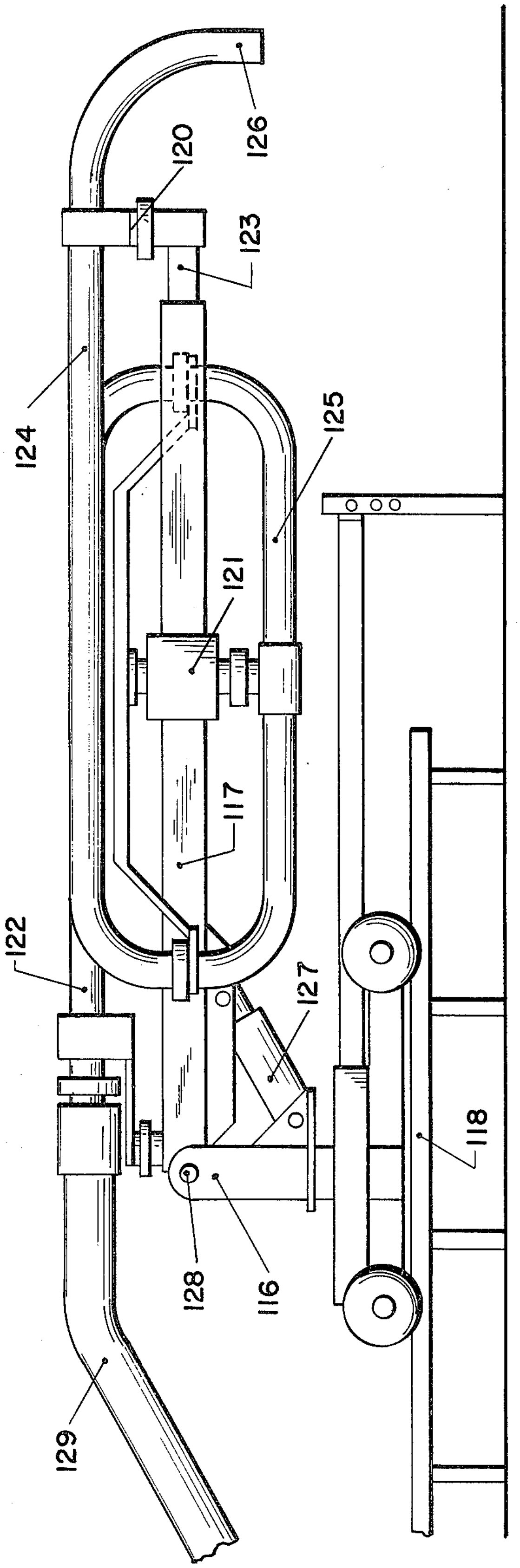

FIG. 11 shows an alternate embodiment of the present invention in which the conduit conveying portion is mounted onto a movable undercarriage having a boom which is extendable and retractable longitudinally and which is movable vertically about a generally horizontal axis and laterally about a generally vertical axis.

Figures 12, 13, 14:
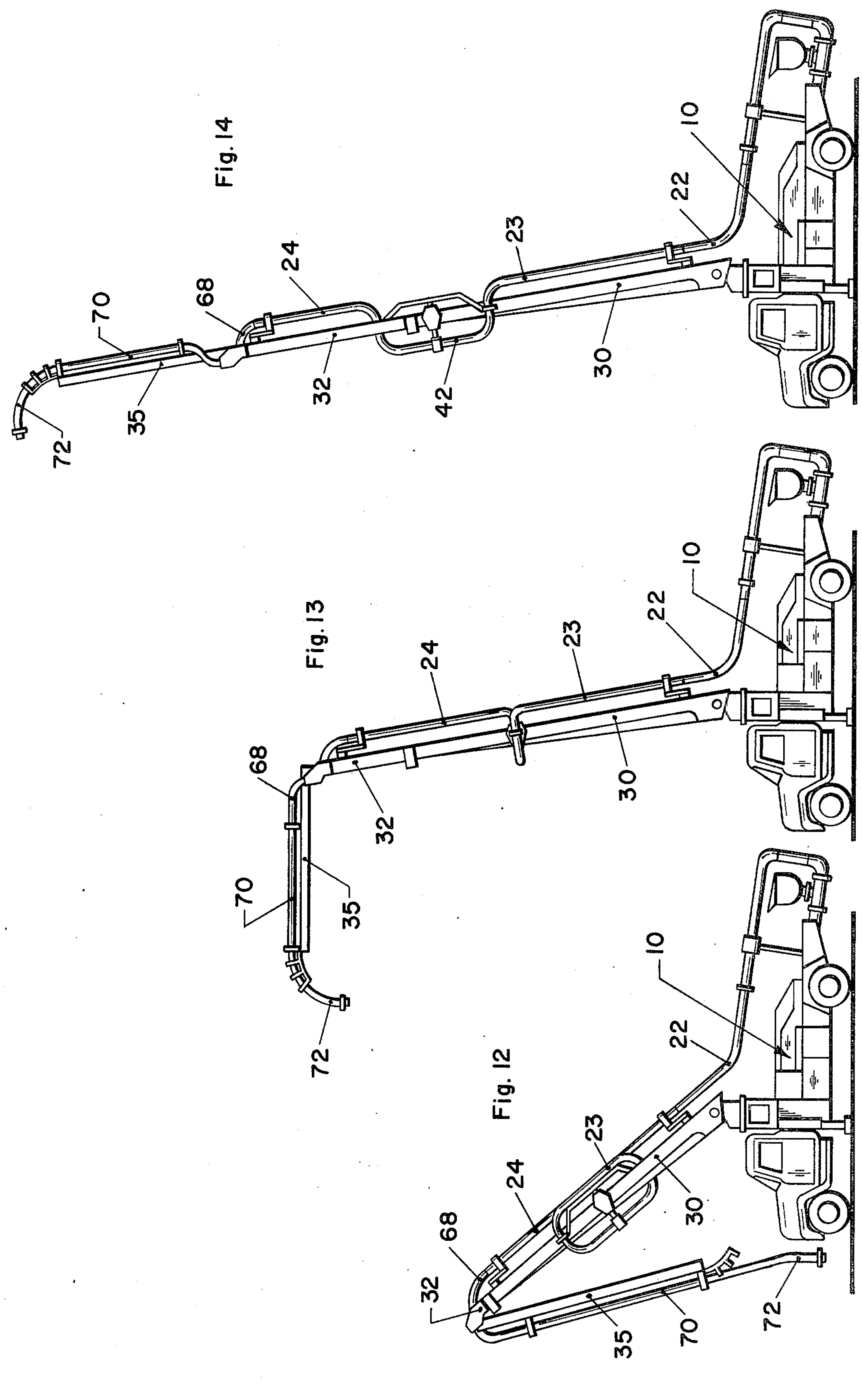

FIGS. 12, 13 and 14 show various extended and retracted positions of the preferred embodiment of the present invention.

DESCRIPTION OF THE PREFERRED EMBODIMENT

Figure 1:
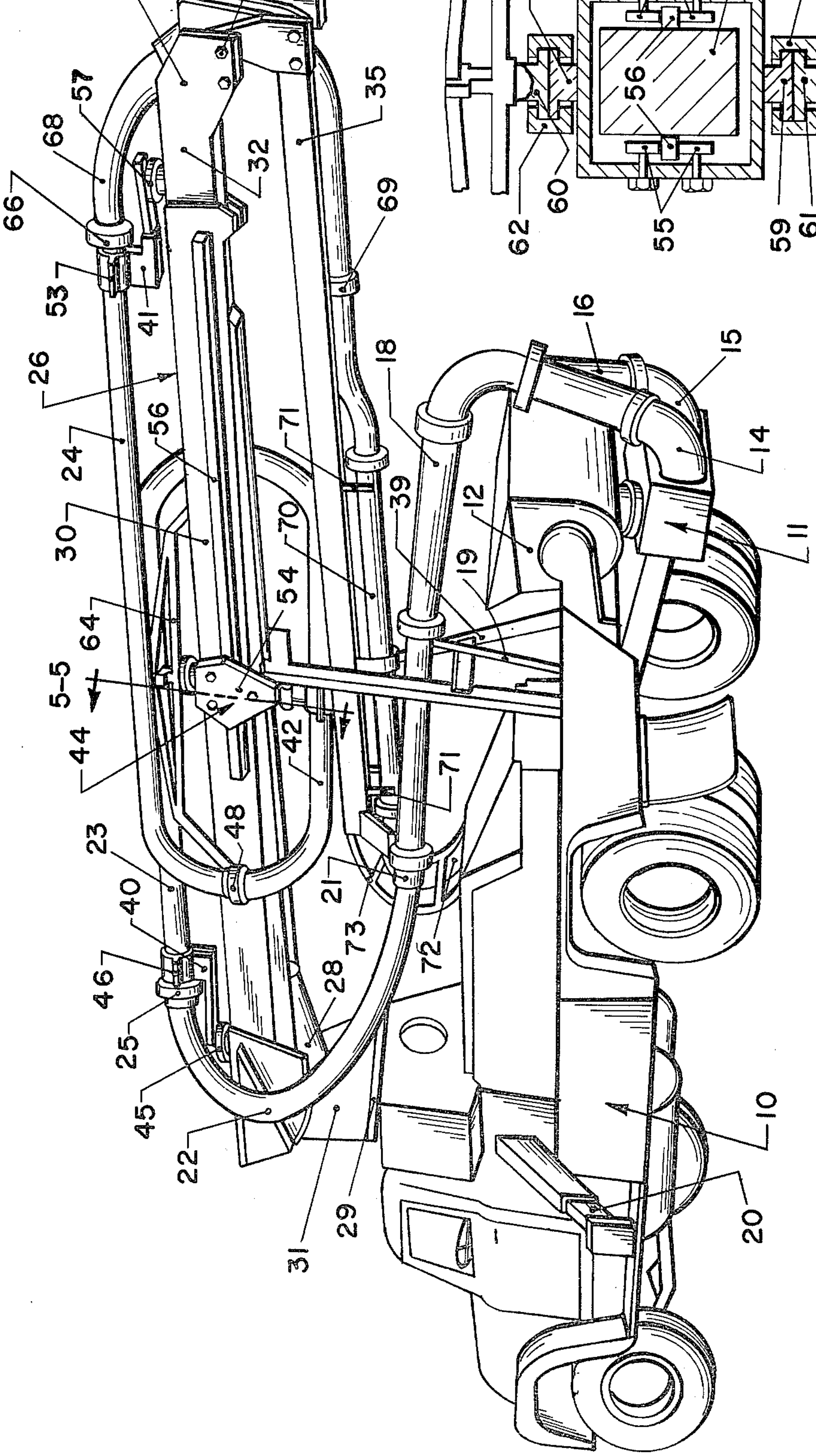
FIG. 1 is a pictorial view of the preferred embodiment of the present conveying apparatus mounted onto a truck body.

Reference is first made to FIG. 1 showing the preferred embodiment of the present invention in which the material conveying apparatus is mounted onto a conventional wheel supported truck body 10. At the outset it should be noted that the preferred embodiment of the present invention has been adapted particularly for the conveyance of slurry materials such as concrete, although it should be recognized that the present invention can be readily adapted for use in conveying various other types of materials as well. Also, as will become apparent with the discussion and description of the various alternate embodiments, the conveying apparatus can be mounted on or with respect to a variety of support structures other than the wheel mounted truck body shown in FIG. 1.

Associated with, and connected to, the rearward end of the truck body 10 is a conventional concrete pump indicated generally by the reference numeral 11. The concrete pump 11 includes a hopper or bin 12 into which concrete is supplied and a pair of pumping cylinders partially illustrated in FIG. 1 by reference numerals 14 and 15. Each of the cylinders 14 and 15 comprises reciprocally movable pumping pistons which are sequenced so that when one is in its power stroke, the other is in its suction stroke. During operation, concrete in the hopper 12 is supplied to the pumping cylinders 14 and 15 where it is pumped into the Y-shaped adaptor section 16 and then into a relatively rigid delivery conduit 18 rigidly secured to the truck body 10 by appropriate supporting structure 19. Although a variety of concrete pumps can be utilized with the present invention, one example of an acceptable pump is described and illustrated in U.S. Pat. No. 3,532,442.

The truck body 10 is provided with a pair of hydraulically operated, telescoping outriggers which lock into position when fully extended. One of the outriggers 20 is positioned on each side of the truck. When in operation, the outriggers are extended, providing the truck with the stability necessary for operation of the conveyor apparatus.

Connected with the rigid conduit section 18 by an appropriate conventional coupling 21 is a section of flexible conduit 22 which connects the conduit section 18 to a first conduit section 23. Similar to the connection between the conduits 18 and 22, the connection 25 between the conduits 22 and 23 is a conventional connecting element known generally to those skilled in the art.

Mounted on, and operatively connected with, the truck body 10 is a telescoping boom 26 which can be elevated and lowered about a generally horizontal axis by appropriate extension and retraction of the hydraulic cylinder means 28. The boom 26 can also be swung from side to side about a generally vertical axis 29 by appropriate known means (not shown). The boom 26 shown as mounted on the truck body 10 in FIG. 1 and as separate from the truck body in FIGS. 2, 3 and 4 includes a first or main boom section 30 having its inward end connected in generally cantilever fashion to a boom support 31 mounted on the truck body 10. Telescopically connected with the main boom section 30 is a second or extension boom section 32 which is only partially shown in FIG. 1, but which is more fully shown in two of its extended positions in FIGS. 3 and 4. The extension boom 32 is telescopically mounted with respect to the main boom 30 and is adapted for longitudinal outward and inward movement within the main boom 30.

The outward end of the extension boom section 32 includes a jib mounting bracket 34 to which an articulating jib 35 is rotatably connected. In the preferred embodiment, the articulating jib 35 is not telescopically mounted with respect to the extension boom section 32 but is only pivotally mounted about the point 36. A conventional means which is known in the art and which is partially indicated by the reference numeral 38 serves as a means for selectively moving the jib section 35 relative to the extension boom section 32 about the pivot point 36. When in its totally retracted transport position as illustrated in FIG. 1, the articulating jib 35 is supported by a support member 39 extending upwardly from the truck body 10. When in operation, the articulating jib 35 can be moved to a variety of positions relative to the extension boom section 32 as shown in the illustrations of FIGS. 12, 13 and 14.

Figures 2, 3, 4, 6, 6A:
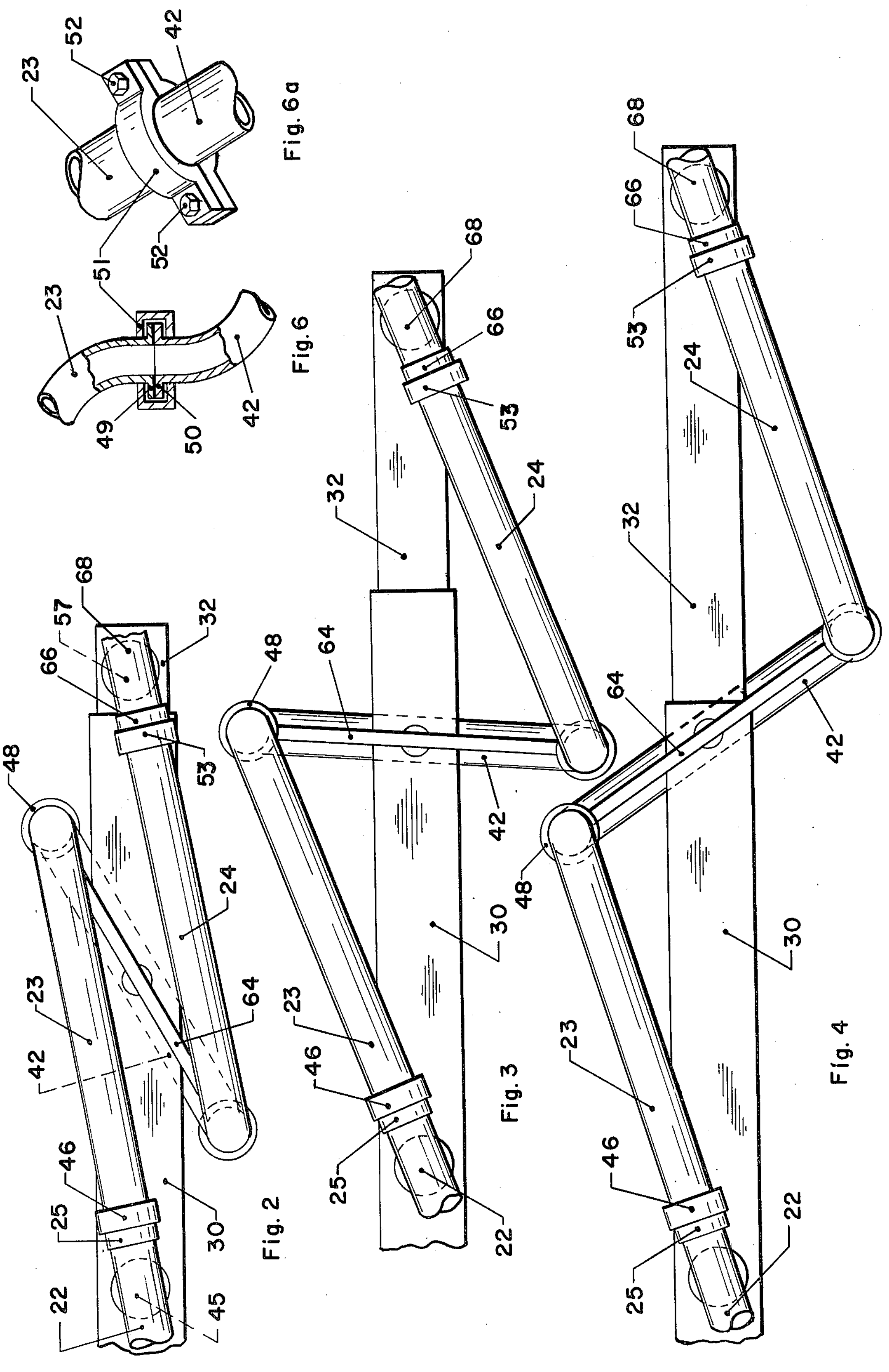
FIG. 2 is a top view of the conduit conveyor portion of the present conveying apparatus showing the relationship between the conduit sections when the apparatus is in its retracted position.
FIG. 3 is a top view similar to that of FIG. 2 showing the conveying apparatus of the present invention in a partially extended position.
FIG. 4 is a top view similar to FIGS. 2 and 3 showing the conveying apparatus of the present invention in its fully extended position.
FIG. 6 is a partial sectional view of the swivel connection between two sections of the rigid conveying conduits.

As shown best in FIG. 1 and also in FIGS. 2, 3 and 4, the conveying apparatus of the present invention includes first and second support means 40 and 41, first and second relatively rigid conduit conveying sections 23 and 24, a relatively rigid intermediate conduit conveying section 42 swivelly connected with the first and second conveying sections 23 and 24, and a third support means 44 for supporting the intermediate conduit section 42.

The first conduit conveying section 23 is supported near one of its ends by the first support means 40 which in turn is rotatably mounted at a support point to the upper surface of the main boom section 30 by an appropriate coupling 45. The first support means 40 is rigidly secured to the conduit section 23 by an appropriate connection bracket 46, thereby rendering the conduit section 23 pivotable about the support point defined by the coupling 45.

The first conduit section 23 is a relatively rigid, hollow tubular element having a generally straight section connected with the support means 40 and a generally downwardly curving section swivelly connected to one end of the intermediate conduit section 42. Although the connection between the downwardly curved end of the first conduit section 23 and the one end of the intermediate conduit section 42 is hidden in FIG. 1 by the main boom section 30, the swivel connection is identical to the swivel connection 48 between the other end of the intermediate conduit section 42 and the downwardly curved end of the second conduit section 24.

The swivel connection between the intermediate conduit 42 and each of the first and second conduit sections 23 and 24 may be comprised of a variety of types of connector couplings. In the preferred embodiment, however, this swivel connection is accomplished with a structure similar to that shown in FIGS. 6 and 6*a*. As shown in these figures, each of the conduit sections to be joined together in such swivel arrangement includes a flange portion 49 and 50 extending completely around the circumference of the respective sections 23 and 42. Such flanges 49 and 50 have generally smooth end faces for mating with one another in a slidable relationship. The mating flanges 49 and 50 are secured together by a split-ring coupling 51 having a generally U-shaped cross section. The split-ring coupling 51, when in operative position, extends completely around the flanges 49 and 50. As shown best in FIG. 6, the width across the space between the legs of the U-shaped split-ring 51 approximates the combined thickness of the flanges 49 and 50 so as to secure the flanges together in a fluid tight, relatively movable position. A plurality of bolts 52 are provided for securing the split-ring coupling 51 in place.

Similar to the first conduit section 23, the second conduit section 24 includes a relatively straight section having its end connected with and supported by the second support means 41 and a downwardly extending portion having its end connected in swivel relationship to an end of the intermediate section 42 by the coupling 48. The second support means 41 is rigidly secured to the second conduit section 24 near one of its ends by an appropriate connection bracket 53 and is pivotally secured by an appropriate coupling 57 to the forward end of the extension boom section 32. Thus, the second conduit section 24 is pivotally secured to the outer boom section 32 about the support point defined by the coupling 57.

The intermediate conduit section 42 is a generally U-shaped section connecting the downwardly extending ends of the first and second conduit sections 23 and 24. The intermediate conduit section 42 is pivotally supported at a point between its ends by a third support means 44 movable longitudinally along the inner boom section 30. As illustrated generally with respect to FIG. 1 and specifically with respect to FIG. 5, the third support means 44 includes an outer support carriage 54 extending completley around the inner boom section 30 and being supported relative to the boom section 30 as the result of engagement between a plurality of support rollers 55 appropriately journaled in the outer carriage 54 and a support rail or track 56 extending longitudinally on each side of the boom section 30. Integrally connected with the top and bottom surfaces of the carriage 54 are flange portions 58 and 59, respectively, for swivel connection with mating flange portions 60 and 61, respectively. The flange portions 58 and 60 and the flange portions 59 and 61 are joined in swivel arrangement by an appropriate split ring 62 in a manner similar to the swivel connections illustrated in FIGS. 6 and 6*a*. The flange portion 60 is rigidly secured to a support frame element 64 which extends between the ends of the downwardly extending portions of the first and second conduit sections 23 and 24 to provide support and stability for such sections. The flange portion 61 is rigidly secured to the intermediate conduit section 42 at a point between its ends via an appropriate split ring clamp member 65.

Figure 5:
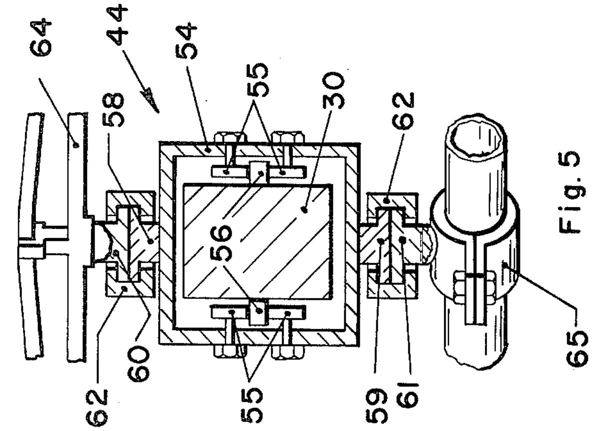
FIG. 5 is a sectional view taken along the line 5—5 of FIG. 1 showing the manner in which the intermediate conduit section is supported from the boom in the preferred embodiment of the present invention.

As can be seen from FIG. 1 and from FIGS. 2, 3 and 4, the third support means 44 is movable generally longitudinally along the inner boom section 30. Such movement is also along a line extending between the support points 45 and 57 of the first and second support members 40 and 41, respectively. The third support means 44 provides support and stability for the intermediate conduit section 42 and the first and second conduit sections 23 and 24, and further provides for pivotal movement between the intermediate conduit section 42 and the third support means 44 at the point of connection between the flange portions 59 and 61 (FIG. 5). The actual operation and interaction of the various conduit sections 23, 24 and 42 and the various support means 40, 41 and 44 will be discussed more fully below.

Connected to the outward end of the second conduit section 24 via the connecting coupling 66 is a section of flexible conduit 68 whose other end is connected via the coupling 69 to a relatively rigid jib conduit 70. The jib conduit 70 is securely connected with an outer portion of the jib boom 35 by a pair of appropriate connecting brackets 71, 71. Connected to the forward end of the jib conduit 70 by an appropriate connector is a drophose 72 comprised of a section of flexible conduit for directing the concrete or other material conveyed to the location desired. The inward portion of the drophose 72 is supported by an appropriate cradle member 73 securely connected to the outward end of the jib boom 35 to prevent the drophose 72 from bending too sharply.

The operation of the preferred embodiment of the present invention illustrated in FIG. 1 can be understood best with reference to FIGS. 2, 3 and 4 which show the conveying apparatus in a retracted position (FIG. 2), in a partially extended position (FIG. 3) and in a fully extended position (FIG. 4) and in FIGS. 12, 13 and 14. As shown in FIGS. 2 and 12, when the extension boom section 32 is in its fully retracted position, the third support means 44 is positioned substantially inwardly of the outer end of the first conduit section 23, and the conduit sections 23, 24 and 42 are collapsed in a retracted position. In FIGS. 3 and 13, the apparatus is shown in a partially extended position in which the extension boom section 32 is extended outwardly from the main boom section 30. When in this position, the third support means 44 has moved outwardly along the main boom 30 to a point equal to the length of the first conduit section 23, and the conduit sections 23, 24 and 42, have opened up or expanded so that the section 42 is generally perpendicular to the main boom section 30. In FIGS. 4 and 14, the extension boom section 32, the third support means 44 and the various conduit sections 23, 24 and 42 are all in their fully extended positions.

It should be noted that in the preferred embodiment, the support points of each of the first and second support means 40 and 41 are movable longitudinally with respect to each other along a straight line extending through such support points. For example, the extension boom section 32, which is telescopically movable with respect to the main boom section 30, causes resulting longitudinal movement of the support points 45 and 57. The third support member 44 which supports the intermediate conduit section 42 is movable generally longitudinally along the straight line extending between the support points 45 and 55.

It should also be noted that the preferred embodiment shown in FIG. 1 utilizes only a single intermediate conduit section 42 with a single support member 44. Although not specifically illustrated in the preferred embodiment, it is contemplated (as shown by the alternate embodiments in FIGS. 7–10) that the conveying apparatus could have a plurality of intermediate conduit sections. Each of these sections would be similar to the section 42 and would be positioned between the first and second conduit sections 23 and 24. For optimum support and stability, it is contemplated that each of these additional intermediate conduit sections would have a corresponding support member similar to the support member 44 and would also have additional support means similar to the support member 64 of FIG. 1. If only one intermediate conduit section is utilized, the ends of such section are connected to the downwardly extending ends of the first and second conduit sections 23 and 24. If more than one intermediate conduit sections are utilized, however, each of the two end intermediate conduit sections would have one of its ends connected to the downwardly extending ends of either the first or second conduit sections 23 and 24, with its other end swivelly connected to each other or to an adjacent intermediate conduit section. Although the benefits and advantages of the present invention can be achieved with any number of intermediate conduit sections between the first and second conduit sections 23 and 24, it is preferable if there are an odd number of intermediate conduit sections between the first and second sections.

During operation of the preferred embodiment, concrete is pumped via the concrete pump 11 through the conveying conduits 18, 22, 23, 42, 24, 68, 70 and 72 where it is discharged at the desired location. As illustrated in FIGS. 12, 13 and 14, the conveying apparatus of the preferred embodiment can be extended and retracted longitudinally, can be swung from side to side about a generally vertical axis and can be elevated and lowered about a general horizontal axis to provide greater flexibility in the placing or distribution of concrete or other materials.

In addition to the preferred embodiment illustrated in FIGS. 1–4, it is contemplated that various other embodiments can be constructed which utilize the teachings of the present invention. One of these alternate embodiments is illustrated in FIGS. 7 and 8. FIG. 7 shows the embodiment in a fully retracted position and FIG. 8 shows the embodiment in a fully extended position. In this embodiment, the truck body of the preferred embodiment has been replaced by a wheel mounted crane upon which is mounted a conventional telescoping boom means having a main boom section 75, a first extension boom section 76 and a second extension boom section 77. The embodiment illustrated in FIGS. 7 and 8 provides for first and second conduit sections 23 and 24 and a plurality of intermediate conduit sections 78, 79 and 80. Sections 78 and 80 are supported in a manner similar to the intermediate section 42 (FIG. 1) by appropriate support means 81, 81 movable along the boom sections 75 and 76. Although the intermediate section 79 which is swivelly connected to each of the sections 78 and 80 is shown as being supported only by the ends of sections 78 and 80, an additional support member similar to the supports 81 can be provided. Also, it is contemplated that each of the sections 78, 79 and 80 can be additionally supported by a brace member similar to the member 64 of FIG. 1. The embodiment of FIGS. 7 and 8 is also provided with an appropriate source of concrete through the flexible conduit 82. The concrete is conveyed to the desired location via the conduit sections 23, 24, 78–80 and by the jib means 84 in the manner discussed with respect to the embodiment of FIGS. 1–4.

The operation of the embodiment illustrated in FIGS. 7 and 8 is similar to that of the preferred embodiment. As the extendable boom sections 76 and 77 extend outwardly, the various conduit sections begin to unfold in the manner illustrated in FIGS. 2, 3 and 4. When each of the extendable sections 76 and 77 is fully extended, the conduit conveying means will be fully expanded as illustrated in FIG. 8.

FIG. 9 shows a further embodiment of the present invention. In this embodiment, the present invention is utilized as part of a delivery system for delivering concrete from one location to another along a track or guide means 85. As illustrated, first and second rigid conduit sections 86 and 88 are connected via suitable couplings to supply and delivery conduits 89 and 90, respectively. One end of the first conduit section 86 is supported by the support means 91, while one end of the second conduit section 88 is supported by the second support means 92. The two intermediate conduit sections 94 and 95 are supported respectively by the supporting trolley members 96 and 98 which ride on, and are guided by, the track 85. The intermediate conduit section 99 is swivelly connected and supported by an end of each of the conduit sections 94 and 95. Each of the intermediate conduit sections 94, 95 and 99 can further be supported by brace members similar to the member 64 of FIG. 1. Similar to the other embodiments, the conduit sections 94 and 95 are pivotally mounted with respect to their support members 96 and 98 which are movable along the track 85 which extends generally in a straight line between the support points of the support members 91 and 92. In operation, as the support members 91 and 92 move longitudinally with respect to each other along a line extending through their support points, the conduit sections expand and retract as previously described.

The embodiment of FIG. 10 shows a side discharge application of the present invention. Specifically, the entire conveying apparatus is supported by the elongated truss boom 100 extending across an area where the discharge of concrete or other material is desired. The truss boom 100 is supported at each of its ends by a wheel mounted carriage 101 for moving the entire truss structure over the area where discharge is desired. The first support means 102 which is pivotally secured to one end of the truss boom 100 supports one end of the first conduit section 108. The second support means 104 pivotally supports one end of the second conveying conduit 109 and is adapted for movement longitudinally along the truss boom 100 by a plurality of rollers engaging appropriate track portions of the truss boom 100. The end of the first conduit section 108 supported by the support 102 is connected by an appropriate coupling to a supply conduit 114, while the end of the second conduit section 109 supported by the support 104 is connected to a side discharge conduit 115 for delivery of the concrete or other material. The two intermediate conduit sections 110 and 111 connected with the other ends of the conduit sections 108 and 109 are supported near their midpoints by the carriages 105 and 106 which are suspended from the truss boom 100. Each of the supports or carriages 105 and 106 is provided with a plurality of roller means for engagement with the track portion of the truss boom 100 for longitudinal movement therealong. The intermediate conduit 112 is swivelly connected to and supported by the conduits 110 and 111. During operation, the second support means 104 moves along the truss boom 100 resulting in corresponding movement of the support members 105 and 106 along the truss boom and expansion of the conduit sections in a manner similar to that of the other embodiments.

A further embodiment of the present invention is illustrated in FIG. 11. In this particular embodiment, the present invention is utilized as a part of a radial spreader apparatus. Such apparatus includes a wheel supported undercarriage 116 movable along a track 118 and a longitudinally extending boom means. The boom means comprises a main boom section 117 and an extension, telescoping boom section 123. Pivotally mounted near the inner end of the boom section 117 is a first support means 119 which supports one end of the first conduit section 122. Connected with the outer end of the boom section 123 is a second support means 120 which pivotally supports the second conveying conduit section 124. The inner end of the first conduit 122 is connected by an appropriate coupling to a flexible delivery conduit 128 while the outer end of the second conduit section 124 is connected by an appropriate coupling to a discharge conduit 126. A third support means in the form of the carriage 121 is movable longitudinally along the inner boom section 117 and pivotally supports the intermediate conduit section 125 in the same manner as described in the preferred embodiment shown in FIG. 1. One end of the intermediate conduit 125 is swivelly connected with, and supports, the outer end of the first conduit section 122 while the other end of the conduit section 125 is swivelly connected with, and supports, the inner end of the conduit section 124. During operation, extension and retraction of the boom section 123 causes movement of the third support means 121 along the boom section 117 and results in the expansion and retraction of the various sections 122, 124 and 125. It can also be seen that the boom means is connected with the undercarriage such that it can be raised and lowered about a generally horizontal axis 128 by the hydraulic cylinder means 127 and can be swung from side to side about a generally vertical axis. The entire undercarriage 116 can also be moved along the track 118.

Although several embodiments and applications of the present invention have been specifically illustrated and described, it is contemplated that various other applications of the teachings of the present invention could also be utilized without deviating from the spirit of the present invention. The basic structural elements of the present invention include first and second support means which are movable at least longitudinally with respect to each other along a line extending through their respective support points and a third support means positioned between the first and second support means and movable longitudinally along a line extending between the first and second support means. The present invention further calls for first and second conveying conduit sections having one of their ends supported by the first and secnd support means and the other of their ends swivelly connected with, and at least partially supported by, a third conveying conduit section. The third conveying conduit section comprises at least one intermediate conduit section supported by the third support means. Within the confines of these structural elements, the inventor has illustrated and described various embodiments and forms for utilizing the advantages and teachings of the present invention.

Thus, although the description of the preferred embodiment and the various alternate embodiments has been quite specific, it is believed that various modifications could be made to such embodiments without deviating from the spirit of the present invention. Accordingly, the inventor intends the scope of the present invention to be dictated by the appended claims rather than by the description of the preferred and alternate embodiments.

I claim:

1. Apparatus for conveying materials comprising:

first and second support means spaced from each other and movable linearly with respect to each other along a longitudinal axis extending through said first and second support means;

third support means comprising at least one support member disposed between said first and second support means and movable linearly with respect to said first and second support means along said longitudinal axis; and a material conveying conduit comprising:

a first relatively rigid conduit section connected with and supported by said first support means near one end of said first conduit section, a second relatively rigid conduit section connected with and supported by said second support means near one end of said second conduit section, and a third conduit section having one of its ends swivelly connected to the other end of said first conduit section about a swivel axis and the other of its ends swivelly connected to the other end of said second conduit section about a swivel axis, said third conduit section including at least one relatively rigid intermediate conduit member, each of said swivel axes being generally perpendicular to and laterally spaced from said longitudinal axis with adjacent swivel axes being spaced laterally from each other and spaced laterally on opposite sides of said longitudinal axis, and said one intermediate conduit member being supported between its ends by a corresponding one of said support members about an axis generally parallel to said swivel axes.

2. The apparatus of claim 1 and a longitudinally extendable boom having at least first and second boom sections telescopically movable with respect to each other and connected respectively with said first and second support means.

3. The apparatus of claim 2 wherein said third support means is movably connected to said extendable boom for movement longitudinally along said boom.

4. The apparatus of claim 3 wherein said one support element of said third support means includes a carriage extending around said extendable boom and being supported for movement longitudinally along said extendable boom by track and roller means.

5. The apparatus of claim 4 wherein said one intermediate conduit section is pivotally supported by said carriage.

6. The apparatus of claim 5 wherein said one intermediate conduit section is pivotally supported by said carriage at a point approximately equidistant between its ends.

7. The apparatus of claim 2 wherein each of said first and second support means is pivotally connected respectively with said first and second boom sections about axes perpendicular to said longitudinal axis.

8. The apparatus of claim 2 having a single intermediate conduit member and a single support member swivelly supporting said intermediate conduit member about an axis generally parallel to said swivel axes.

9. The apparatus of claim 8 wherein said first and second support means support said first and second conduit sections above said extendable boom and said support member of said third support means supports said intermediate conduit below said extendable boom.

10. The apparatus of claim 2 having a plurality of relatively rigid intermediate conduit members and a plurality of support members for supporting said intermediate conduit members.

11. The apparatus of claim 10 having a pair of intermediate conduit sections each having one of its ends swivelly connected respectively to one of the ends of said first and second conduit sections and each being swivelly supported by a support member of said third support means, and a single intermediate conduit section extending between and being swivelly supported by the other of the ends of said pair of intermediate conduit sections.

12. The apparatus of claim 2 including a wheeled crane-type vehicle wherein said extendable boom is mounted for rotation and angular elevation on said vehicle.

13. The apparatus of claim 12 and a wheel supported vehicle supporting said extendable boom in a generally cantilever manner.

14. The apparatus of claim 13 wherein said wheel support vehicle is a truck.

15. The apparatus of claim 1 having means for supplying material to be conveyed to said first conduit section and means connected to said second conduit section for directing said materials to the desired location.

16. The apparatus of claim 15 wherein said means for supplying material to said first conduit section includes a concrete pump.

17. The apparatus of claim 1 wherein at least one of said first and second support means is movable relative to the other along a track means.

18. The apparatus of claim 17 wherein said one support member of said third support means and at least one of said first and second support means includes a trolley member having rollers for engaging said track means.

19. The apparatus of claim 18 wherein said track means includes a truss boom supported near its ends for lateral movement.

20. Apparatus for conveying materials comprising:

first and second support means mounted on a longitudinally extendible boom and movable linearly with respect to each other along the longitudinal axis of said boom;

third support means comprising at least one support member mounted on said boom between said first and second support means and movable linearly with respect to said first and secod support means along the longitudinal axis of said boom; and a material conveying conduit comprising:

a first conduit section connected with and supported by said first support means near one end of said first conduit section, a second conduit section connected with and supported by said second support means near one end of said second conduit section, and a third conduit section having one of its ends swivelly connected to the other end of said first conduit section about a swivel axis and the other of its ends swivelly connected to the other end of said second conduit section about a swivel axis, said third conduit section including at least one intermediate conduit member, each of said swivel axes being generally perpendicular to and laterally spaced from said longitudinal axis with adjacent swivel axes being spaced laterally from each other and spaced laterally on opposite sides of said longitudinal axis, each of said intermediate conduit members being supported between its ends by a corresponding one of said support members and having its respective ends disposed on opposite lateral sides of said longitudinal axis, said adjacent intermediate conduit members being disposed alternately above and below said extendible boom.

* * * * *